Nov. 13, 1956     O. W. BONNAFE     2,770,028
BROACH WITH MULTIPLE SMALL CUTTING UNITS
Filed Jan. 31, 1955     2 Sheets-Sheet 1
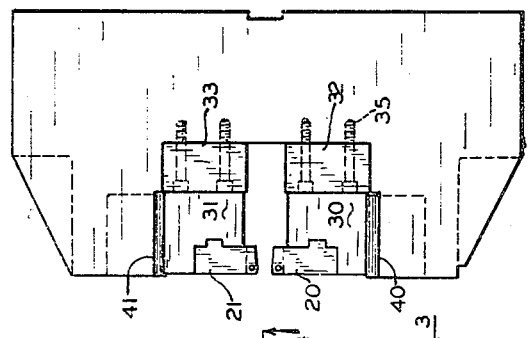
Fig. 3
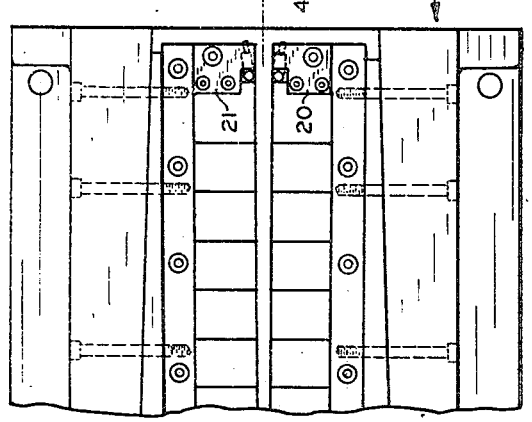
Fig. 1
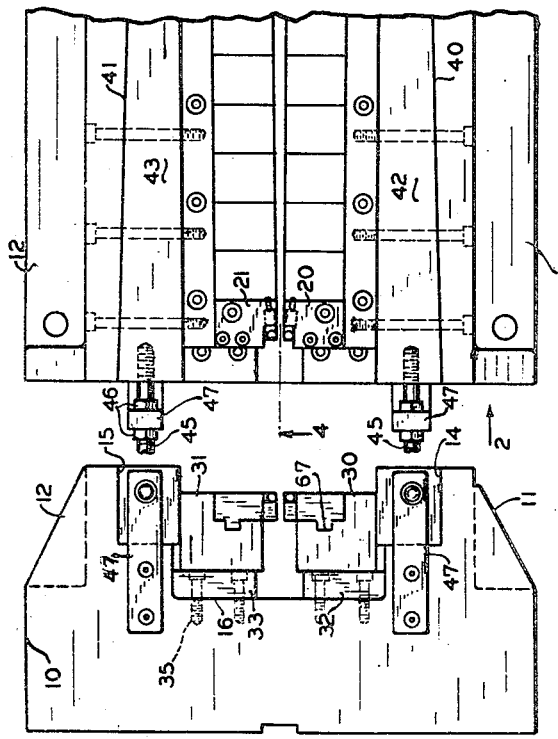
Fig. 2
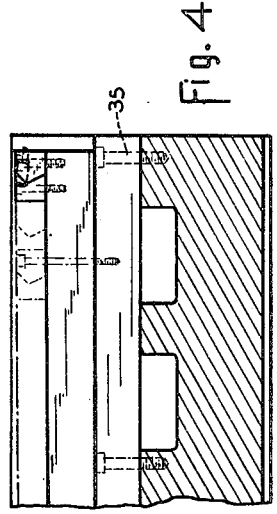
Fig. 4
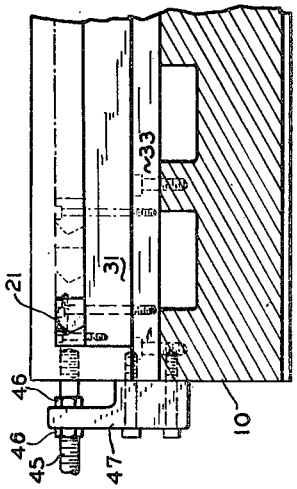
*INVENTOR.*
OLIVER W. BONNAFE.
BY Chas. T. Hawley
ATT'Y.

Nov. 13, 1956     O. W. BONNAFE     2,770,028
BROACH WITH MULTIPLE SMALL CUTTING UNITS
Filed Jan. 31, 1955     2 Sheets-Sheet 2
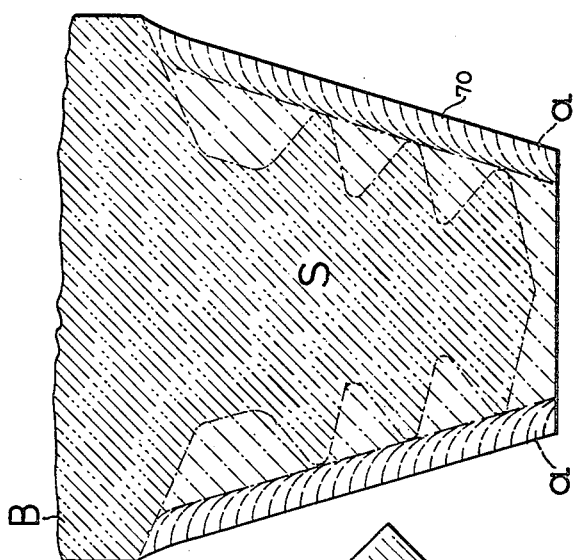
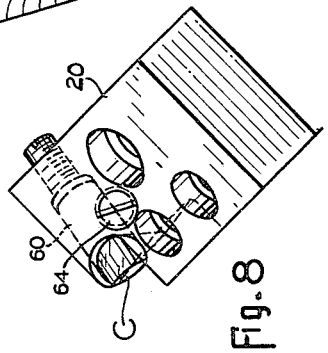
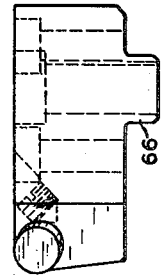
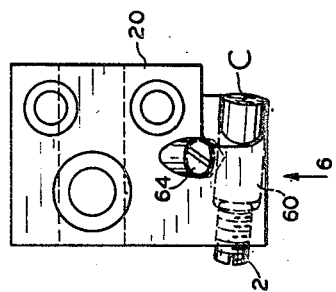
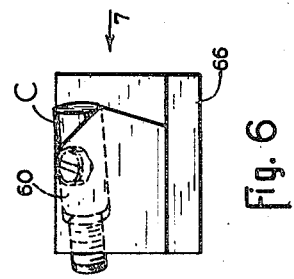
INVENTOR.
OLIVER W. BONNAFE.
BY
Chas. T. Hawley
ATT'Y.

United States Patent Office 2,770,028
Patented Nov. 13, 1956

2,770,028

BROACH WITH MULTIPLE SMALL CUTTING UNITS

Oliver W. Bonnafe, Hudson, Mass., assignor to The Lapointe Machine Tool Company, Hudson, Mass., a corporation of Maine Application January 31, 1955, Serial No. 484,981

2 Claims. (Cl. 29—95.1)

This invention relates to a broach particularly designed for cutting cobalt steel and other hard and tough metals. A common use of this broach is in cutting the shanks or holding portions of blades to be inserted in the rotors of large steam turbines.

Steel alloys of this type can be satisfactorily machined only by using carbide-type steel for the cutting edges. It is the general object of my invention to provide a broach which utilizes such carbide steel in the form of a multiplicity of small units, each separately and replaceably mounted in the broach structure.

A further object is to provide the carbide steel in the form of small cylinders which may be angularly shifted to present successive circumferential portions as new cutting edges, and which may also be turned end-for-end to provide additional cutting edges.

I also provide a broach having two roughly parallel sets or series of cutting units, together with improved means for adjusting the sets of units transversely relatively to each other.

In the preferred form, I mount each small cutting unit in a separate block or holder, which in turn is firmly secured to a supporting bar adjustably mounted in the broach body.

My invention further relates to arrangements and combinations of parts which will be hereinafter described and more particularly set forth in the appended claims.

A preferred form of the invention is shown in the drawings, in which:

Fig. 1 is a partial plan view of my improved broach;

Figs. 2 and 3 are end elevations of the broach, looking in the directions of the arrows 2 and 3 in Fig. 1;

Fig. 4 is a sectional side elevation, taken along the line 4—4 in Fig. 1;

Fig. 5 is a plan view of a holder and cutting unit;

Fig. 6 is a front elevation, looking in the direction of the arrow 6 in Fig. 5;

Fig. 7 is an end elevation, looking in the direction of the arrow 7 in Fig. 6;

Fig. 8 is a perspective view of the parts shown in Fig. 5; and

Fig. 9 is a diagrammatic view illustrating the operation of the broach.

Referring to the drawings, my improved broach comprises a base 10 having raised side portions 11 and 12, recessed side portions 14 and 15 and a deeply recessed middle portion 16.

The cutters C (Fig. 5) are mounted in blocks or holders 20 and 21, and these blocks or holders are mounted in longitudinally extended series on holder-supporting bars 30 and 31. The supporting bar 30 rests on the tapered or wedge-like member 32, and the bar 31 rests on a similar tapered member 33. The bars 30 and 31 are commonly of uniform cross-section and are vertically positioned by the tapered members 32 and 33 to provide inclined fixed supporting surfaces abutted by said holders 20 and 21. The members 32 and 33 are firmly secured against the bottom surface of the middle recess 16, after adjustment, as by screws 35.

The inner faces 40 and 41 of the side projections 11 and 12 are continuously tapered throughout the length of the broach, and tapered or wedge-like members 42 and 43 are interposed between the surfaces 40 and 41 and the supporting bars 30 and 31.

The angles at which the bars are supported are resultants of the angles of the surfaces 40 and 41 and the taper of the members 42 and 43.

Studs 45 are mounted in the ends of the bars 42 and 43 and are provided with nuts 46 engaging opposite sides of brackets 47 secured to the end of the broach. By means of the nuts 46, the tapered bars 42 and 43 may be longitudinally adjusted to provide differential transverse adjustment of the bars 30 and 31.

Each block or holder as 20 has an inclined cylindrical recess 60 which loosely receives one of the cutting units C. An adjusting screw 62 is provided for adjusting each unit C axially, and a binding screw 64 is provided for clamping the unit in adjusted position. By loosening the screw 64, the unit C can be turned to present a fresh circumferential cutting edge portion. In actual practice, from four to six such fresh cutting edges are provided by each end of the cutting unit C which, as previously described, is also reversible.

Each block or holder 20 or 21 has a projecting rib 66 adapted to fit into corresponding longitudinal grooves 67 (Fig. 2) in the bars 30 and 31.

Fig. 9 is a diagrammatic view of a portion 70 of the blank or forging B from which the shank or holding portion S of a turbine blade is to be machined.

The first operation is to remove the stock in a series of relatively small cuts from the outer side portions of the shank portion S, thus trimming the shank to the maximum transverse dimensions of the finished shank. Each of the small areas indicated by the letter $a$ in Fig. 9 is removed by one of the cutters C in one of the holders 20 or 21.

The tapered wedge bars 32 and 33 (Figs. 3 and 4) position the supporting bars 30 and 31 at angle as shown in Fig. 4, so that successive cutters C remove progressively higher portions $a$ of the blank B.

At the same time, the wedge-bars 42 and 43 coact with the inclined surfaces 40 and 41 to position the holders 20 and 21 and the cutters C at progressively increasing distances apart.

During the broaching operation, the blank B is held in fixed position and the broach moves to the left relative to the blank, as indicated by the arrow X in Fig. 1. The shank portion S of the blank B is thus progressively and accurately machined to the desired transverse outside dimensions of the finished shank.

The shank in its completely finished form preferably has the so-called "Christmas tree" outline shown in broken lines in Fig. 9, but the broaching of the grooves or recesses in the sides of the shank is accomplished in a succeeding operation which forms the subject matter of a copending application.

The broach herein described has the outstanding advantage that only a relatively small amount of the expensive carbide steel is used in a complete broach. Furthermore, each small cutting unit is so designed that both ends of the unit are available for cutting purposes and that from four to six fresh cutting edges may be provided by each of the two ends of the cutting unit by shifting the unit angularly. Consequently, it is possible to attain the advantages of carbide steel but without the very heavy expense of using tools formed entirely of such special steel.

Having thus described my invention and the advantages thereof, I do not wish to be limited to the details herein disclosed, otherwise than as set forth in the claims, but what I claim is:

1. In a broach, a plurality of relatively small cutting units, a separate holder for each unit, supporting bars on which said holders are assembled in longitudinal series and with the cutting units in each series gradually approaching the center line of the broach in one direction, a broach body having fixed raised side portions with their inner surfaces gradually approaching toward the most widely separated cutting units, wedge-bars interposed between said supporting bars and said fixed side portions, and means to adjust said wedge-bars longitudinally to vary the transverse spacing of said units while preserving their original angular relation.

2. In a broach, a broach body having front and back surfaces, a plurality of relatively small cutting units, a separate holder for each unit, longitudinally extended bars mounted at the front surface of said body and receiving said holders in two transversely spaced longitudinal series, with the cutting units gradually approaching the center line of the broach toward the first cutting units, means to adjust said bars transversely while preserving their original angular relation, tapered supporting members underlying said bars and having bar-engaging surfaces which gradually approach the back surface of the broach body toward the first cutting units, and means to adjust said members longitudinally to raise or lower said cutting units relative to the work but without change in the original angular relation of the series of units relative to the back surface of the broach body.

References Cited in the file of this patent

UNITED STATES PATENTS

| | | |
|---|---|---|
| 45,187 | Spaulding | Nov. 22, 1864 |
| 318,718 | Gibson | May 26, 1885 |
| 446,074 | Myers | Feb. 10, 1891 |
| 1,045,984 | Kirig | Dec. 3, 1912 |
| 1,254,589 | Forsman | Jan. 22, 1918 |
| 2,101,624 | Muller | Dec. 7, 1937 |

FOREIGN PATENTS

| | | |
|---|---|---|
| 658,460 | Great Britain | Oct. 10, 1950 |

OTHER REFERENCES

Article: "Broach Guide with Adjustable Shoe," by W. Burr Bennett, from American Machinist, January 31, 1924, vol. 60, Chapter 5, page 186.